United States Patent [19]

Lehtovaara

[11] 4,165,731

[45] Aug. 28, 1979

[54] SELF-ADJUSTING DRIVE SHAFT FOR BARBECUE GRID

[76] Inventor: Ritva M. Lehtovaara, 20 S. Close Green, Merstham, Surrey, England

[21] Appl. No.: 894,313

[22] Filed: Apr. 7, 1978

Related U.S. Application Data

[63] Continuation-in-part of Ser. No. 570,553, Apr. 22, 1975, abandoned.

[30] Foreign Application Priority Data

Apr. 23, 1974 [GB] United Kingdom ............... 17716/74
Jul. 4, 1974 [GB] United Kingdom ............... 29659/74

[51] Int. Cl.² .......................... A47J 37/07; F24B 3/00
[52] U.S. Cl. .................................. 126/25 AA; 99/385; 64/2 R
[58] Field of Search ..................... 99/391–393, 99/339, 340, 420, 421, 443, 450; 126/25 R, 25 A, 25 AA; 15/104.35 N, 143, 144; 64/1 C, 2 R, 8, 23.6; 74/501, 502; 403/393, 104

[56] References Cited

U.S. PATENT DOCUMENTS

| 715,356 | 12/1902 | De Vito ................................ 64/2 R |
| 843,590 | 2/1907 | Dunn et al. ........................ 15/144 B |
| 2,535,548 | 12/1950 | Porter ................................ 99/421 A |
| 2,617,135 | 11/1952 | Larsen .......................... 15/104.35 N |
| 2,887,703 | 5/1959 | Williams ....................... 15/104.35 N |
| 3,008,405 | 11/1961 | Boyer ............................ 99/421 HV |
| 3,033,190 | 5/1962 | Atkinson ................................ 126/25 |
| 3,085,497 | 4/1963 | Statia, Sr. ............................. 99/340 |
| 3,090,372 | 5/1963 | Evans ............................. 126/25 AA |
| 3,128,637 | 4/1964 | Richoux ................................ 64/2 R |
| 3,298,301 | 1/1967 | Lowndes ...................... 99/421 HV |

FOREIGN PATENT DOCUMENTS

32920 10/1962 Finland ................................. 15/143 B
100115 9/1916 United Kingdom .................. 99/421 R

*Primary Examiner*—Harvey C. Hornsby
*Assistant Examiner*—Timothy F. Simone
*Attorney, Agent, or Firm*—Karl W. Flocks

[57] ABSTRACT

A barbecue having a rotatable grid is provided with a motor and drive shaft to rotate the grid. The drive shaft is self-adjusting for use with different heights of grid and sizes of barbecue. The drive shaft may be used to adapt existing barbecues.

12 Claims, 5 Drawing Figures

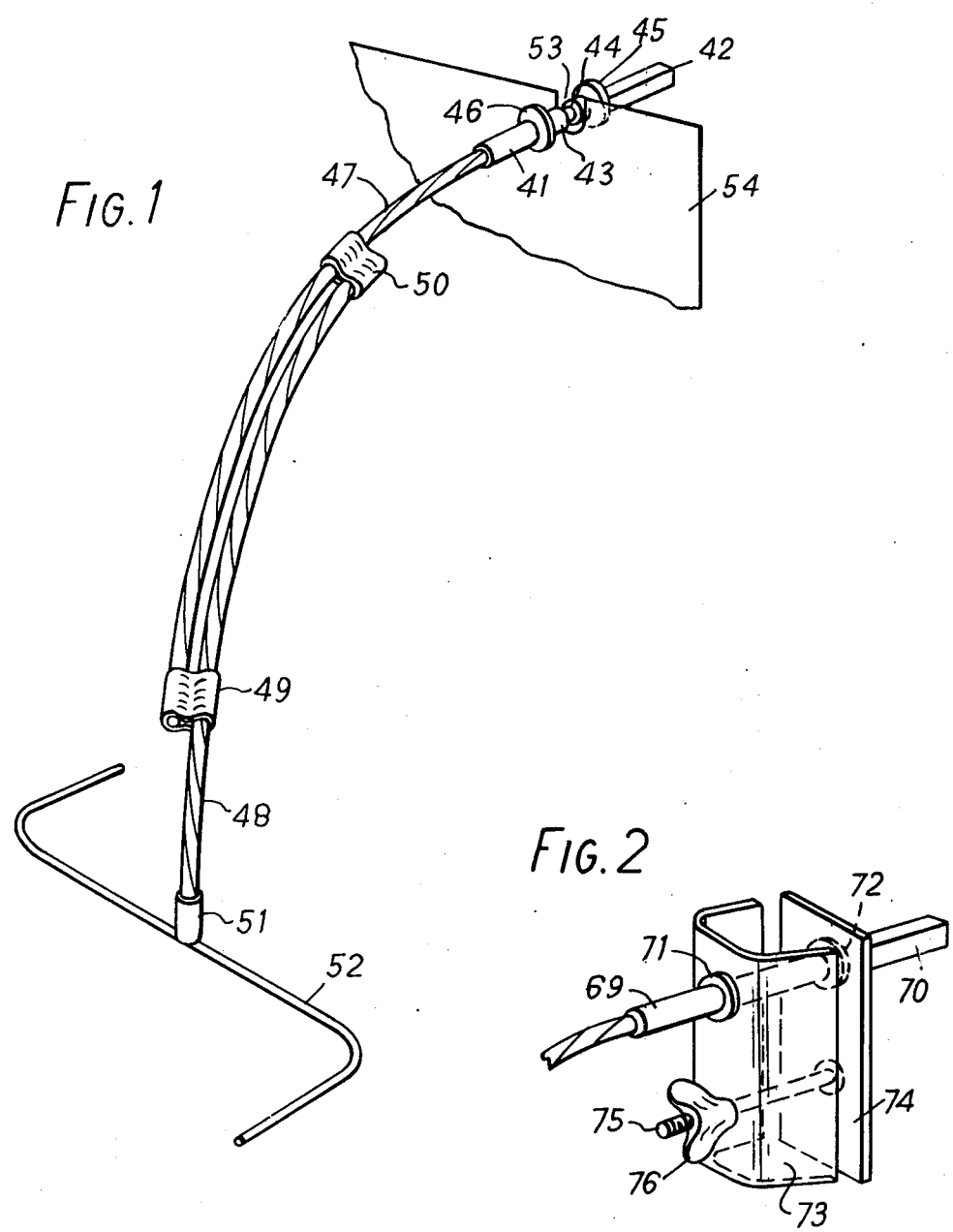

SELF-ADJUSTING DRIVE SHAFT FOR BARBECUE GRID

This is a continuation-in-part of application Ser. No. 570,553, filed April 22, 1975, abandoned.

BACKGROUND OF THE INVENTION

This invention relates to the barbecues in which the grill grid is rotatable and components for such barbecues.

A barbecue generally consists of a device in which food to be cooked, usually meat, is held over a bed of burning fuel such as charcoal, the food being supported by a grid. The grid is frequently circular and mounted horizontally. Barbecues are frequently made portable and self-contained to facilitate use in the open air, particularly for garden parties, picnics and the like.

It is normally very difficult to have the fuel burning so evenly in the barbecue that there results an even distribution of heat to the food placed on the grill grid of the barbecue. Uneven burning frequently results in local hot spots which can burn the food. It is known that the food can be prevented from burning in those places which are especially close to the hot spots of the fuel, by rotating the grid and, therefore, distributing the heat evenly for the food. The simplest way to achieve this goal is to construct the grill to be rotatable and to rotate it manually. However, this generally requires continuous attendance of the barbecue by the cook.

PRIOR ART

Attempts have been made to provide barbecues with grids which are driven in rotation by a motor. An example of such a barbecue is described in U.S. Pat. No. 3,090,372 (Evans). However the barbecue of Evans has the major disadvantage that the drive shaft connecting the motor to the grid is of constant length so that it is not readily possible to vary the height of the grid, as is commonly required during cooking with a barbecue. Raising or lowering the grid of Evans from its normal position has the effect of deforming the flexible drive shaft and greatly increasing the power required to rotate the grid. This is a major disadvantage when the barbecue is intended to be fully portable and self-contained, and therefore uses a battery-driven electric motor, as the size of the motor and the batteries required to drive are considerably increased as the power required to drive the grid increases.

Another type of power-driven grid is described in U.S. Pat. No. 3,085,497 (Statia). Statia describes an arrangement in which the grid is driven by a vertical rigid shaft which is itself driven through a gear-box by a transverse shaft connected to a motor. The gear-box has to be very robust, as it is positioned directly above the grid and so is subjected to strong heating while in use. The arrangement of Statia is heavy, expensive and cumbersome to set up and dismantle when used as a portable unit.

Other types of barbecue have been described in which a motor is mounted below, instead of above, the grid and fuel bed, to drive a shaft which extends upwardly through a hole in the fuel bed. Such barbecues are described in U.S. Pat. Nos. 3,033,190 (Atkinson) and 3,298,301 (Lowndes). This arrangement has the disadvantage that the construction of the fuel bed, and also assembly of the barbecue when unpacked, are quite complex and the motor is likely to be affected by molten fat falling from the cooking food.

SUMMARY OF THE INVENTION

It is an object of the present invention to provide a power-driven barbecue which is cheap and simple to manufacture and offers no problems in dismantling for transport, e.g. in the luggage compartment of a car, or in setting up for use at any desired site.

It is a further object of the invention to provide such a barbecue in which the height of the grid above the fuel bed may be altered within wide limits without elaborate adjustment of the drive from the motor and while the barbecue is in use.

The invention also relates to a drive shaft which may be used to adapt existing barbecues having manually-rotated grids to automatic operation.

According to one aspect of the invention there is provided an adjustable length flexible drive shaft for use in barbecues, comprising:

first and second flexible members each having an eye terminal fixed to an end thereof, said first flexible member being engaged by and slidable through and rotatable in said eye terminal fixed to said second flexible member and said second flexible member being engaged by and slidable through and rotatable in said eye terminal fixed to said first flexible member so that when the eye terminals are separated from each other, on rotation of one flexible member relative to the other the portions of the flexible members between the eye terminals are twisted around each other thereby fixing the length of the drive shaft, means for attachment to a motor on an end of said first flexible member, and means for attachment to a barbecue grid on an end of said second flexible member.

According to another aspect there is provided a barbecue which comprises a stand supporting a body member adapted for containing a bed of burning fuel, a rotatable horizontal grid mounted above the fuel bed, a motor mounted above the grid, and a flexible drive shaft connecting said motor to said grid to rotate said grid continuously, said driving shaft comprising two flexible members each provided with an eye terminal fixed to an end thereof and engaging the other said flexible member so that each said flexible member is slidable through and rotatable in said eye terminal fixed to said other flexible member whereby upon rotation of one flexible member by said motor relative to the other flexible member when the eye terminals are separated the flexible members are twisted around each other between the eye terminals thereby automatically fixing the length of the driving shaft.

The flexible shaft of the invention is constructed of two flexible parts which can, in the non-working position, freely slide and rotate within loops fixed to one end of both parts. This construction has two distinct advantages over hitherto known devices. First, the same device can be used in a barbecue of any size. Secondly, the invention provides automatic adjustment of the shaft length when the height of the grid is altered without any need of touching the shaft by hand. This is very important since the shaft becomes extremely hot when the fuel is burning and would be most difficult to handle even with the help of protective gloves and/or tools.

The shaft may be supplied by special means which make it possible to fix the device both to the grid and to the body structure of the barbecue.

In the preferred embodiment of the invention, the flexible shaft consists of two pieces of flexible wire rope both having any eye terminal fixed to one end of it. These flexible shaft parts are connected to each other by passing each length of wire through the eye terminal of the other, so that the parts can both slide and rotate within the eye terminals. One of the flexible shaft parts may be fixed to the grid at its other end and the other end of the other flexible shaft part may have a square cross-section to fit the drive of a motor. The latter end of the device may also be equipped with means to support it of the wind shield or other parts of the barbecue.

The use of two flexible shaft parts connected by eye terminals has many advantages over the prior art. First, this configuration will make it possible to vary the length of the shaft within very wide limits (a ratio of nearly 2:1 when the parts have the same length). Secondly, since the shaft parts can rotate within the loops, on rotation by the motor the shaft parts twist around each other locking the shaft to a fixed length. This is an important feature since trials have shown that if the shaft does not have its optimum length there is obtained extremely uneven rotating speed of the grid due to the slack or extra tension in the shaft being released periodically by the rotating movement of the shaft.

When the barbecue is assembled with the shaft parts in the non-twisted condition the parts, sliding freely through the eye terminals, adapt themselves automatically to the optimum length which varies according to the height of the grid. When the motor is started the shaft parts become twisted around each other and are locked against each other by friction so that the length of the shaft is fixed. If the height of the grid is altered during use, so that the length of the shaft should be altered, it is only necessary to reverse the motor for a short time to unwind the shaft. The shaft then adapts itself immediately to the new height, by sliding of the parts through th eye terminals, and when the motor is re-started in the forward direction (or allowed to continue in the reverse direction) the shaft parts are again twisted and locked together at the new length.

This self-locking action does not take place when the shaft is fully extended, so that none of the shaft part lengths are between the eye terminals, but in this case the shaft is necessarily at its maximum length and no locking action is necessary. It is found that a strong locking action is obtained even when the lengths of the shaft parts between the eye terminals is quite small. On twisting of the shaft parts a certain amount of friction is generated between the shaft and the eye terminal through which it passes and this contributes to the locking action.

Preferred embodiments of the invention include special configurations for connecting the shaft to the grill grid and to the motor, at the same time supporting the shaft and the motor by the wind shield or other parts of the barbecue body. An S or Z-shaped wire may be fixed to the grid end of the shaft so that this wire can be tied or otherwise fixed to the grid. The motor end of the device may be supplied by washers or a U-shaped clamp so that it will be retained in a slot or other aperture in the wind shield or in the other parts of the barbecue where the clamp may be fixed. The end of the shaft together with the barbecue body and/or clamp will now form a structure which will support the motor especially when the driving torque of the latter will press the clamping pin of the motor against the shaft and/or the barbecue body.

DESCRIPTION OF PREFERRED EMBODIMENTS

Preferred embodiments of the invention will now be described with reference to the accompanying drawings in which:

FIG. 1 is a perspective view of a drive shaft for a barbecue with an associated plug member, FIG. 2 is a side view of a plug member for use with the drive shaft of FIG. 1 and means for clamping it to a barbecue body.

Figure 3:
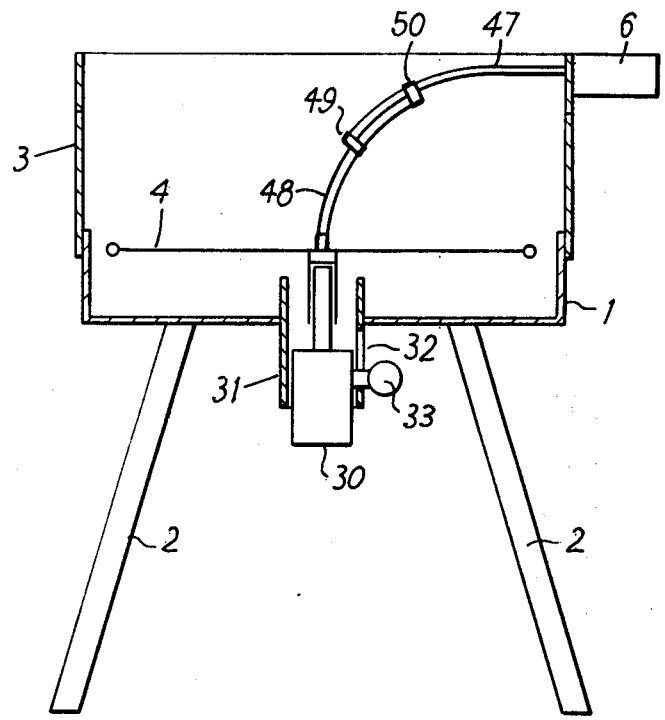
FIG. 3 is a schematic section of a barbecue using the drive shaft according to the invention.

As shown in FIG. 1, the drive shaft comprises two flexible parts of steel wire 47, 48 each having respective eye terminals 49, 50 rigidly attached to one end. Each flexible part passes through the eye terminal of the other part so that it can freely slide through and rotate in the eye terminal. The length of the shaft is thus variable within wide limits.

The free end of part 48 is attached by tubular terminal 51 to an S-shaped grip wire 52 to engage a barbecue grid. The free end of part 47 is provided with plug means 41 for attaching it to part of the body 54 of the barbecue. The plug means 41 comprises a pair of washers 45, 46 surrounding a cylindrical part 43 which is attached to and rotatable with the part 47. Part 43 may pass through a slot 53 in the body 54 and is retained therein by the washers. The end 42 of the plug, rotatable with the part 43, is of square crosssection to fit into the drive of an electric motor.

FIG. 2 shows an alternative means for attaching the drive shaft to the barbecue body. In this case the part 47 is attached to and rotatable with a plug 69 provided with washers 71 and 72 and a square end 70 to fit an electric motor. The plug passes through holes in a support plate 74 and a U-shaped member 73 which may be held together by bolt 75 and wing nut 76. In use, the body 54 (FIG. 1) may be clamped between the plate 74 and member 73 by nut and bolt 76 and 75, th plug passing through a slot or other aperture in the body 54.

FIG. 3 shows schematically the general arrangement of a barbecue using the drive shaft of FIG. 1 or 2. The barbecue comprises a body member for containing burning fuel 1 supported by a stand comprising legs 2 and surrounded by a wind shield 3. Rotatable grid 4 is mounted to rotate above the bed of burning fuel and is attached to the drive shaft 5 which is as described with reference to FIG. 1 above. The drive shaft passes through a slot in the wind shield 3 and is drivable by the battery-driven motor 6 mounted on the wind shield.

Figure 4:
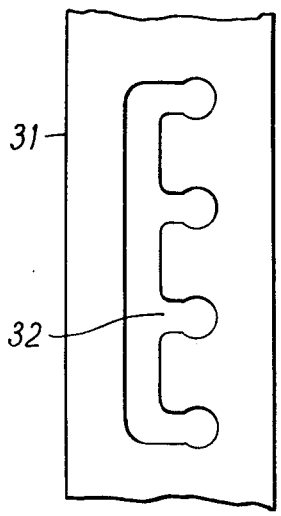
FIG. 4 shows part of FIG. 3.

The grid is mounted to rotate on a vertical shaft 30 which is variable in height. This shaft is mounted in an enclosure 31 having aperture 32 through which a handle 33 attached to the shaft 30 passes. The aperture 30 is stepped, in the manner shown in FIG. 4, so that the grid may be set at different heights.

When the barbecue is assembled for use of the upper end of the drive shaft is connected to the wind shield 3 and to the motor 6 by the plug means at its end. The lower end of the shaft is connected to the grid by means of the S-shaped grip wire.

As explained above, the flexible shaft adjusts its length automatically according to the height of the grid and the horizontal separation between the motor and the center of the grid. The same shaft may thus be used for different sizes of barbecue. When the motor is started the flexible parts of the shaft first rotate relative to each other so that the shaft is twisted and locked to fix its length. On continued operation of the motor the shaft and grid are rotated at an even rate. If it is desired to alter the height of the grid during cooking it is only necessary to reverse the direction of the motor to untwist the flexible shaft and adjust the grid height by operating handle 33 whereon the flexible shaft alteras its length automatically by sliding through the eye terminals. The shaft then becomes twisted and locked at its new length on continued operation of the motor.

Figure 5:
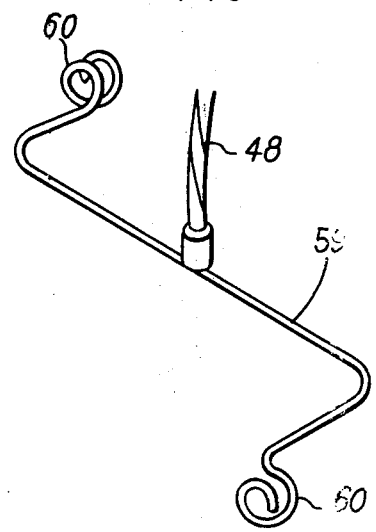
FIG. 5 shows part of another type of flexible drive shaft.

FIG. 5 shows the lower end of a flexible drive shaft which is the same as in FIG. 1 except that the S-shaped wire 52 of FIG. 1 is replaced by wire 59 which has loops 60 at its ends to grip the grid.

I claim:

1. An adjustable length flexible drive shaft for use in barbecues, comprising:

first and second flexible members each having an eye terminal fixed to an end thereof, saif first flexible member being engaged by and slidable through and rotatable in said eye terminal fixed to said second flexible member and said second flexible member being engaged by and slidable through and rotatable in said eye terminal fixed to said first flexible member so that when the eye terminals are separated from each other, on rotation of one flexible member relative to the other the portions of the flexible members between the eye terminals are twisted around each other thereby fixing the length of the drive shaft, means for attachment to a motor on an end of said first flexible member, and means for attachment to a barbecue grid on an end of said second flexible member.

2. A flexible drive shaft according to claim 1, provided with means to attach one of said flexible members to the barbecue including means to prevent sliding of said flexible members through an aperture in the barbecue.

3. A flexible drive shaft according to claim 2, in which said means to prevent sliding includes a pair of washers connected to said one of said flexible members to engage the barbecue on opposite sides of the aperture.

4. A flexible drive shaft according to claim 1, provided with fastening means to attach one of said flexible members to the barbecue including a pair of plates between which the walls of an aperture in the barbecue may be clamped, the drive shaft passing between holes in said plates.

5. A flexible drive shaft according to claim 1, in which said means for attachment to a barbecue grid comprises a generally S or Z-shaped grip wire on the end of said second flexible member.

6. A flexible drive shaft according to claim 1, in which said means for attachment to a barbecue grid comprises a grip wire having loops at its ends for engaging the grid.

7. A barbecue which comprises a stand supporting a body member adapted for containing a bed of burning fuel, a rotatable horizontal grid mounted above the fuel bed, a motor mounted above the grid, and a flexible drive shaft connecting said motor to said grid to rotate said grid continuously, said driving shaft comprising two flexible members each provided with an eye terminal fixed to an end thereof and engaging the other said flexible member so that each said flexible member is slidable through and rotatable in said eye terminal fixed to said other flexible member whereby upon rotation of one flexible member by said motor relative to the other flexible member when the eye terminals are separated the flexible members are twisted around each other between the eye terminals thereby automatically fixing the length of the driving shaft.

8. A barbecue according to claim 7, in which said driving shaft passes through an aperture in said body member and the driving shaft includes means to prevent sliding of the driving shaft through the aperture.

9. A barbecue according to claim 8, in which said means to prevent sliding includes a pair of washers connected to one of the flexible members to engage the barbecue on opposite sides of the aperture.

10. A barbecue according to claim 7, provided with fastening means attaching one of said flexible members to said body member including a pair of plates between which the walls of an aperture in the body member are clamped, the flexible member passing between holes in said plates.

11. A barbecue according to claim 7, in which the flexible drive shaft is connected to the barbecue grid by a generally S or Z-shaped grip wire on an end of one of the flexible members.

12. A barbecue according to claim 7, in which the flexible drive shaft is connected to the barbecue grid by a grip wire having loops at its end for engaging the grid.

* * * * *